Figure 1:
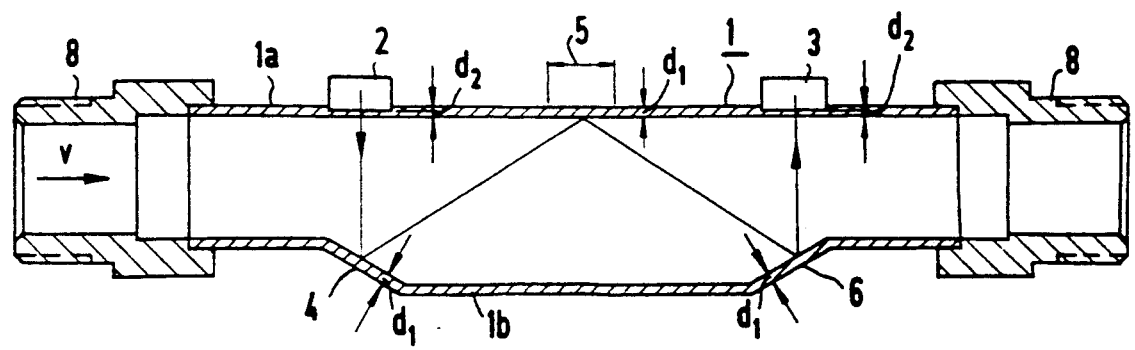

United States Patent [19]
Tschirner

[11] Patent Number: 5,090,252
[45] Date of Patent: Feb. 25, 1992

[54] ULTRASONIC FLOW MEASUREMENT INSTALLATION

[75] Inventor: Peter Tschirner, Nuremberg, Fed. Rep. of Germany

[73] Assignee: Siemens Aktiengesellschaft, Berlin and Munich, Fed. Rep. of Germany

[21] Appl. No.: 460,915
[22] PCT Filed: Aug. 10, 1988
[86] PCT No.: PCT/EP88/00715
  § 371 Date: Feb. 9, 1990
  § 102(e) Date: Feb. 9, 1990
[87] PCT Pub. No.: WO89/01609
  PCT Pub. Date: Feb. 23, 1989

[30] Foreign Application Priority Data
Aug. 10, 1987 [DE] Fed. Rep. of Germany ....... 3726584

[51] Int. Cl.$^5$ .............................................. G01F 1/66
[52] U.S. Cl. ............................................... 73/861.28
[58] Field of Search ............ 73/861.27, 861.28, 861.29, 73/861.31

[56] References Cited
U.S. PATENT DOCUMENTS

| | | |
|---|---|---|
| 3,906,791 | 9/1975 | Lynnworth ...................... 73/861.29 |
| 3,964,308 | 6/1976 | Scarpa . |
| 4,103,551 | 8/1978 | Lynnworth . |
| 4,555,951 | 12/1985 | Gutterman . |
| 4,610,167 | 9/1986 | McShane .......................... 73/861.28 |

*Primary Examiner*—Charles A. Ruehl
*Attorney, Agent, or Firm*—Kenyon & Kenyon

[57] ABSTRACT

An ultrasonic fluid-flow measuring device in which a measuring tube having a rectangular cross section and a measuring tube wall lying opposite a pair of ultrasonic transformers is provided. The device utilizes three flat surface elements angled with respect to each other to reflect an ultrasonic beam so as to guide its passage through the fluid. Such structure provides a device in which the flow of the fluid is not impaired at any place in the measuring tube, and in which the inner walls of the measuring tube are free of niches which might promote the deposition of particles located in the fluid.

5 Claims, 1 Drawing Sheet

ULTRASONIC FLOW MEASUREMENT INSTALLATION

The invention concerns an ultrasonic flow measuring device according to the echo time method having a measuring tube traversed by the flow of a medium, whereby the measuring tube has two ultrasonic transformers designed as combined transmit and receive transformers stagger-mounted in the direction of flow of the medium and at least one reflector reflecting the ultrasound between the ultrasonic transformers.

This kind of an ultrasonic flow measuring device is known e.g. from the teachings of DE-A1-35 39 948. In the known arrangement, a medium flows through the measuring tube, which has a fundamentally rectangular inner cross-section. Two ultrasonic transformers are stagger-mounted in the direction of flow on two opposing, parallel measuring tube walls. Two combined transmit and receive transformers, which are designed as interdigital transformers according to DE-A1 30 20 282, serve the purpose as ultrasonic transformers.

Interdigital transformers have a direction of radiation or reception, respectively, lying at an angle to the surface. The ultrasound radiated from a first ultrasonic transformer is transmitted to a first reflector, which is mounted in the direction of flow on the measuring tube wall lying opposite the first ultrasonic transformer and staggered with the first ultrasonic transformer. From there, the ultrasound is reflected to a second reflector which is mounted in the direction of flow on the measuring tube wall lying opposite the first reflector and is staggered with the first reflector. The second reflector directs the ultrasound to the second ultrasonic transformer. The flow velocity of the medium flowing in the measuring tube is in principle detected in that one measures the differences of the echo times of ultrasonic waves in and against the direction of flow. The difference of the echo times thereby serves as a measure for the flow velocity in the measuring tube.

The disadvantage of the known arrangement is that interdigital transformers are costly to manufacture and therefore expensive. A further disadvantage consists in that the inner walls of the measuring tube in the region of the reflectors are coated with an ultrasound-reflecting material or, respectively, outside of this region with an ultrasound-absorbing material.

According to a specific embodiment according to DE-A1-28 28 397, two ultrasonic transformers are mounted at an angle to the measuring tube wall and in a direction towards each other, and are staggered in the direction of flow on opposing measuring tube walls of the measuring tube through which a medium is flowing. In this manner, both ultrasonic transformers are designed as combined transmit and receive transformers having a transmit and receive direction perpendicular to the surface. The ultrasonic transformers are operated alternately as a transmitting transformer or a receiving transformer, respectively. Thus, ultrasonic waves are transmitted in and against the direction of flow and without interconnection by means of reflectors directly to the respective ultrasonic transformer lying opposite. The adjusting echo time difference serves as a measure for the flow velocity of the medium flowing in the measuring tube.

The disadvantage of this known specific embodiment is that the ultrasonic transformers must be mounted at an angle to the surface of the measuring tube and thus to the direction of flow. Therefore, resistances to flow arise at the location of the mounting of the ultrasonic transformers either in that the ultrasonic transformers jut out into the measuring tube and thus into the flow, or in that the ultrasonic transformers are mounted set back from the measuring tube wall and thus form niches. In both cases, changes are caused in the flow which can lead to deposits on the ultrasonic transformers. In addition, eddies can arise as a function of the velocity of the flowing medium, which falsify the measuring signal.

It is the task of the invention to design a measuring tube such that one can dispense with the use of expensive interdigital transformers, whereby it should be possible to incorporate the ultrasonic transformer in the measuring tube wall without niches being formed.

This task is solved according to the invention in that the ultrasonic transformers have transmit and receive directions lying perpendicular to their surface; that both ultrasonic transformers are mounted on a straight wall of the measuring tube in the direction of flow; that the transmit and receive directions of the ultrasonic transformers are perpendicular to the direction of flow; that the measuring tube wall has a chamfer in each region lying directly opposite the ultrasonic transformers so that the ultrasound radiated from each ultrasonic transformer is reflected off of these chamfers onto the region of the measuring tube wall between both of the ultrasonic transformers and from there off of the additional chamfer onto the additional ultrasonic transformer.

Through the invention, the ultrasound is transmitted and received by means of triple reflection perpendicular to the direction of flow and thus to the measuring tube wall. Thus, the inexpensive ultrasonic transformers, send and receive perpendicular to the surface, can be used advantageously, and an installation is possible plane- parallel to the measuring tube wall.

The ultrasonic transformers are mounted on one side of the measuring tube so that the evaluating electronics can be set up on this side and the connecting lines remain short.

The invention makes possible the installation of the ultrasonic transformers flush to the inner wall of the measuring tube, i.e. a low-loss transmission of the ultrasound through the measuring tube wall. By this means the flow rate profile in the measuring tube is not changed and by this means there is no falsification of the measured value. Moreover, a niche formation and thus deposits are excluded. Thus, the measuring tube is suitable for use in the food industry, where due to the danger of the formation of germs, emphasis is placed on the avoidance of deposits. Through the refinement of the measuring tube wall, the ultrasound is supplied with low loss: the separate reflectors can be dispensed with and a one-piece design is possible, whereby the cost of production is reduced considerably. Moreover, the medium flowing through the measuring tube can be channeled more flow-effectively.

The wall thickness $d_1$ of the measuring tube is advantageously chosen in the reflecting areas so that the ultrasound reflection is maximum according to the formula $d_1 = (2n-1) \lambda/4$ with $n=1,2,3\ldots$, $\lambda$=shockwave length in the housing wall. By this means a lowest- loss possible supply of ultrasound is guaranteed.

It is advantageous when each ultrasonic transformer is set up on the outside of a measuring tube wall so that the ultrasound is transmitted or received through the measuring tube wall and that the wall thickness $d_2$ of the measuring tube in the region of the ultrasonic transformer is selected so that the ultrasound transmittance is maximum according to the formula $d_2 = n \cdot \lambda/2$, with $n = 1,2,3\ldots$, $\lambda$ = the shockwave length in the housing wall. A low-loss ultrasonic coupling and decoupling through the measuring tube wall is made possible by this means.

An advantageous further development consists therein that the ultrasonic transformers are respectively equipped with a high-grade steel base; that one flange per ultrasonic transformer is provided in the measuring tube wall, into which the ultrasonic transformer, respectively, is able to be screwed flush to the inner wall of the measuring tube. Consequently, the ultrasonic transformers are easily exchangeable and are resistent to chemically aggressive media due to the high-grade steel base.

Figure 2:
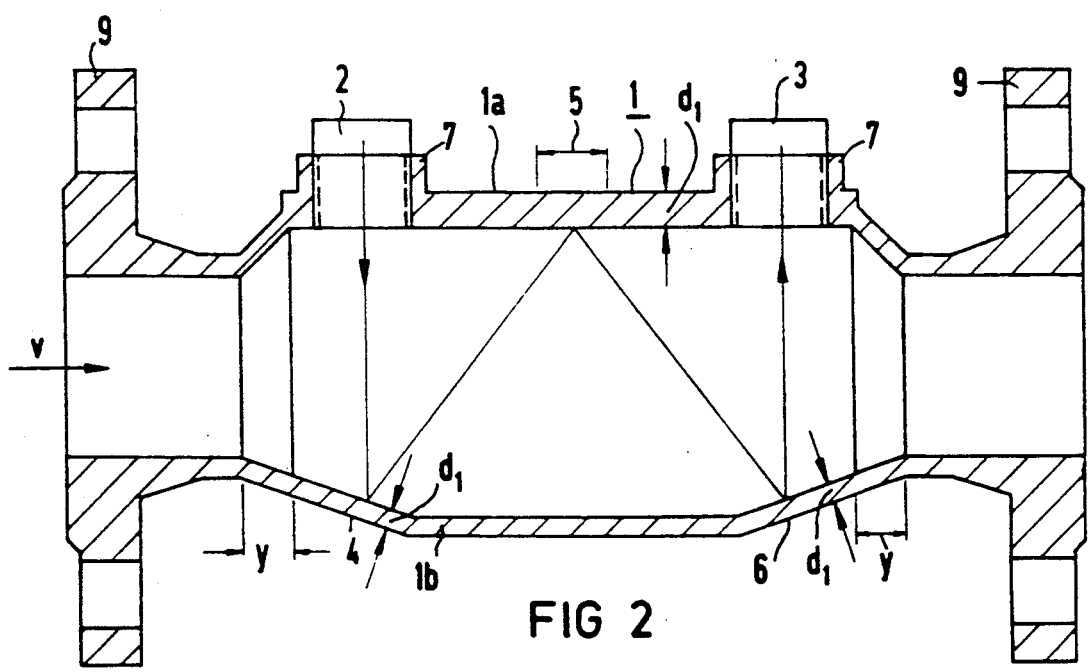

Exemplified embodiments of the invention are described in light of the FIGS. 1 and 2 in the following. Therein are shown:

FIG. 1 an ultrasonic measuring tube in longitudinal section, in which the ultrasonic transformers are mounted onto a measuring tube wall; and FIG. 2 an ultrasonic measuring tube in longitudinal section in whose one measuring tube wall one flange is provided per ultrasonic transformer.

According to the FIGS. 1 and 2, the ultrasonic transformers are stagger-mounted in the direction of flow on a first measuring tube wall 1a of the measuring tube 1 with an essentially rectangular inner cross-section. The region of the second measuring tube wall 1b of the measuring tube 1, located directly opposite the ultrasonic transformers 2, 3, is designed as chamfers 4, 6, respectively.

Outside of this region, the measuring tube walls 1a, 1b run parallel to each other. The ultrasonic transformers 2, 3 are designed as combined transmit and receive transformers, which have transmit and receive directions lying perpendicular to their surfaces. The ultrasonic transformers 2, 3 are triggered by means of a drive circuit arrangement so that an alternating transmit and receive mode is set up. Under the appropriate control, a first ultrasonic transformer 2, 3 transmits ultrasound perpendicularly to the direction of flow towards a first chamfer 4 or 6, respectively, of the second measuring tube wall 1b. From there, the ultrasound is reflected across a region 5 of the first measuring tube wall 1a between the ultrasonic transformers 2, 3 onto a second chamfer 4 or 6, respectively, of the second measuring tube wall 1b, which reflects the ultrasound to the ultrasonic transformer 2, 3, which is operating as a receiver. Subject to the alternating transmit and receive operation of the ultrasonic transformers 2, 3, the ultrasound radiated from the ultrasonic transformers is transmitted alternately in and against the direction of flow v.

The echo time differences of the ultrasound resulting from this can be evaluated according to the socalled echo time difference measurement with the phase difference measurement or as a direct echo-time measurement with the "sing-around method". During the echo time measurement, the frequency of the ultrasonic transformers, which transmit in and against the direction of flow, is set up, respectively, so that the number of the ultrasonic wavelengths along the distance being measured is constant. Both methods are described at length in DE-A1-28 28 937.

In order to obtain a best possible reflection of the ultrasonic waves on the inner wall of the measuring tube 1, the wall thickness $d_1$ of the measuring tube 1, at least in the region of the reflection, is to be selected according to the formula $d_1 = (2n-1) \lambda/4$ with $n = 1,2,3 \ldots$, $\lambda$ = acoustic wavelength in the housing wall.

Thereby, according to FIG. 1, the wall thickness $d_2$ of the measuring tube in the region of the ultrasonic transformers 2, 3 should be selected according to the formula $d_2 = n \lambda/2$ with $n = 1, 2, 3 \ldots$, $\lambda$ = acoustic wavelength in the housing wall, in order to obtain a good ultrasonic transmittance by this means.

According to FIG. 1, a connecting sleeve 8 can be provided, respectively, to connect the measuring tube 1 to an existing tubing system which carries the flowing medium. This connecting sleeve 8 is designed so that a best possible flow junction of a rectangular tube cross-section to a round tube cross-section or vice-versa is made possible on the side turned towards the measuring tube.

In an exemplified embodiment according to FIG. 2, the measuring tube is connected on both faces by one coupling flange 9 each. The region marked with y is equally designed so that a junction from a rectangular tube cross-section to a round tube cross-section is made possible. The measuring tube can be flange-mounted to a tubing system, which carries the medium to be measured, by means of the coupling flange 9.

I claim:

1. An ultrasonic fluid flow measuring device that operates according to the echo-time method, comprising:

one axially extending measuring tube having a rectangular inner cross section and a first, straight, measuring tube wall and a second measuring tube wall, the second measuring tube wall lying opposite the first measuring tube wall and being formed from three flat surface elements angled against each other;

two ultrasonic transformers of the combined transmit and receive type, said transformers being mounted at axially spaced apart locations along the first, straight wall of the measuring tube in the direction of flow of the fluid through the measuring tube, said transformers each having a surface parallel with the first wall and being of the type that can both receive and transmit beams of ultrasonic waves orthogonally with respect to their surfaces so that the ultrasonic beams of the transmitting ultrasonic transformer are issued into the fluid perpendicular to the direction of flow;

one ultrasound reflecting inner surface located on the first measuring tube wall between the two ultrasonic transformers, and one angled ultrasound reflecting surface lying along each of two of said angled portions of the second measuring tube wall opposite each of the ultrasonic transformers; said angled ultrasound reflecting surfaces being tilted towards each other at a sharp angle with respect to the direction of flow of the fluid and being connected to each other by means of a straight surface element parallel to the direction of flow of the fluid; and whereby the ultrasonic beam emanating orthogonally from one of the respective transmitting ultrasonic transformers strikes the opposed angled ultrasound reflecting surface of the second measuring tube wall, and is reflected in the direction towards the ultrasound reflecting inner surface of the first measuring tube wall between the ultrasonic transformers, from which it is reflected onto the second angled ultrasound reflecting surface of the second measuring tube wall, and from which it is reflected onto the respective opposed receiving ultrasonic transformer.

2. The ultrasonic flow measuring device according to claim 1, wherein the wall thickness ($d_1$) of the measuring tube in the region of the reflecting surfaces is selected so as to assure that the ultrasonic beam reflects off of the reflecting surface with maximum intensity by selecting the wall thickness according to the formula $d_1 = (2n-1) \lambda/4$, with $n = 1,2,3 \ldots$, and where $\lambda =$ the shockwave length in the portion of the measuring tube wall off which the beam reflects.

3. The ultrasonic flow measuring device according to claims 1 or 2, characterized in that each ultrasonic transformer is set up on the outside of the first measuring tube wall so that the ultrasound is transmitted or received through the measuring tube wall and that the wall thickness ($d_2$) of the measuring tube in the region of the ultrasonic transformers is selected so that the ultrasonic transmittance is at a maximum according to the formula $d_2 = n \lambda/2$, with $n = 1,2,3 \ldots$, and where $\lambda =$ shockwave length in the portion of the measuring tube wall off which the beam reflects.

4. The ultrasonic flow measuring device according to claim 1 or 2, characterized in that the ultrasonic transformers are equipped with a high-grade steel base, respectively, and each ultrasonic transformer is provided with a flange located in the measuring tube wall into which the ultrasonic transformer may be screwed until it is generally flush with the inner surface of the first measuring tube wall.

5. The ultrasonic flow measuring device according to claim 1, wherein the measuring tube is manufactured from a material resistant to chemically aggressive media.

* * * * *